May 1, 1923.
W. KNUDSEN
TRACTOR
Original Filed April 15, 1919
1,454,027
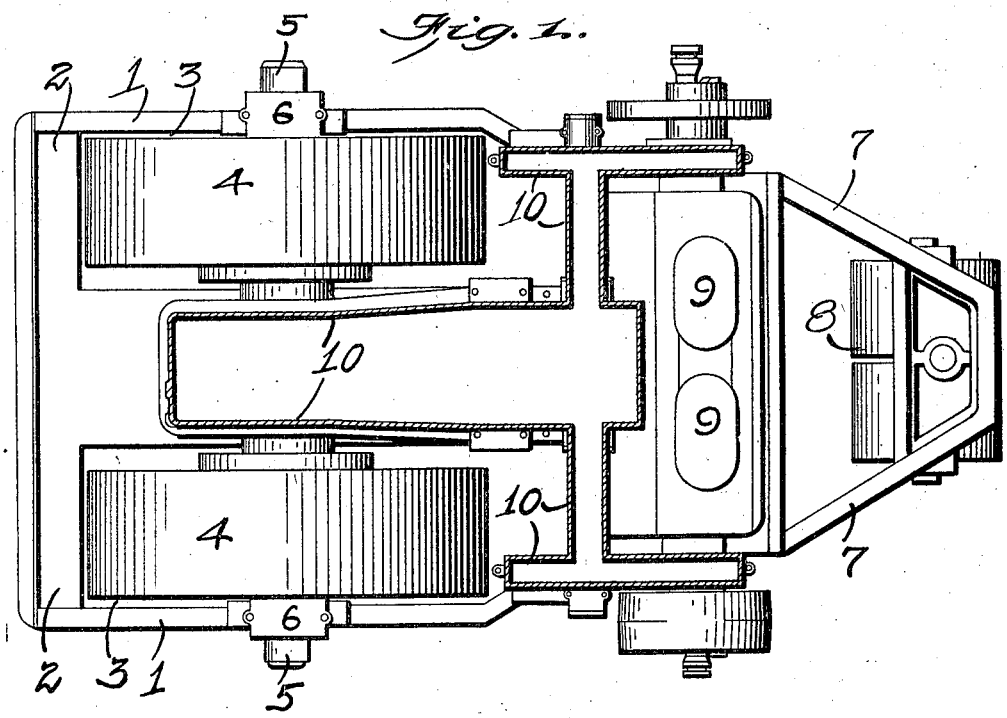
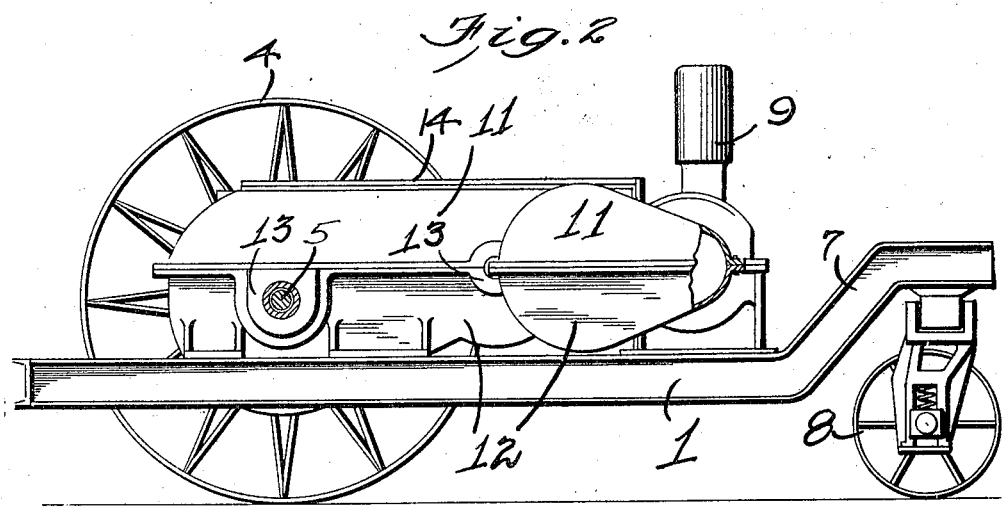
Inventor,
Wm Knudsen
By
Knight attys Patented May 1, 1923.

1,454,027

UNITED STATES PATENT OFFICE.

WILLIAM KNUDSEN, OF FREMONT, NEBRASKA.

TRACTOR.

Application filed April 15, 1919, Serial No. 290,264. Renewed September 20, 1922. Serial No. 589,487.

*To all whom it may concern:*

Be it known that I, WILLIAM KNUDSEN, a citizen of the United States, and a resident of Fremont, in the county of Dodge and State of Nebraska, have invented certain new and useful Improvements in Tractors, of which the following is a specification.

This invention relates particularly to tractors and like self-propelled vehicles, and has for its primary object to provide a tractor in which the main operating parts are housed within a suitable casing, so that they will be protected from dust, dirt and other foreign matter, as well as to provide means whereby the parts will become self-lubricated.

The preferred embodiment of the invention is illustrated in the accompanying drawing, in which Fig. 1 is a top plan view with the upper section of the casing removed; and Fig. 2 is a side elevation, showing one part of the casing in section and the upper section of the casing in position.

Referring now to the drawing by numerals of reference, 1 designates the frame, preferably constructed of steel channel members extending continuously around the tractor. 2 represents a platform which is recessed, as at 3, to accommodate the tractor or drive wheels 4, which are journaled on the frame by the axles 5 and journal bearings 6. The front of the frame is offset, as at 7, and supports the pilot wheel. In the embodiment shown I propose to mount the motor 9 crosswise on the frame 1, with the shaft thereof extending transversely to the tractor. The motor is preferably mounted on the forward part of the frame, and I prefer to use a particular form of drive, such, for instance, as described in my co-pending application filed April 22, 1918, Serial No. 230,080, although the use of this form of drive is not compulsory, so long as the drive involves the feature of what is known as the jack-shaft type. I therefore propose to protect the operating mechanism of the drive and its associated parts by a casing 10, which comprises a unitary structure divided horizontally in a single plane, providing upper and lower sections 11 and 12, respectively, the former being removable to enable access to be had to the operating parts, and the latter section fixed and provided with supporting means, such as the journals 13, for the shafts of the drive and the driving axles for the traction wheels. The upper section 11 is further provided with a plate 14, which is removable for inspection of the operating parts of the drive.

It is to be noted that the casing is so arranged as to confine or house all of the working parts of the drive in such a manner as to enable them to become self-lubricated. Furthermore, although each compartment of the casing is divided in the same plane as its adjacent compartment, they are so arranged to confine the gears from the engine shaft, the main jack shaft, the change speed gears, the drive between the change speed gears and the differential, and the differential; in other words, all operating parts are completely confined within the casing, and by merely removing the upper section the entire drive is left open for repair.

Claims:

1. In a tractor having a motor and a frame structure providing a chassis extending continuously around the tractor, a platform confined with the frame structure, and a casing adapted to house the driving means from the motor to the driving axle, said casing comprising a unitary structure divided horizontally into upper and lower sections, the latter being fixed and the former being removable, providing means for obtaining access to the driving means, said lower section of the casing adapted to support the bearings for the drive shafts of the driving means.

2. In a tractor having a motor, a frame structure comprising channel members providing a chassis extending continuously around the tractor, a platform confined with the frame structure, and a casing adapted to house the driving means from the motor to the driving axle, said casing comprising a unitary structure divided horizontally into upper and lower sections, the latter being fixed and the former being removable, providing means for obtaining access to the driving means, said lower section of the casing adapted to support the bearings for the drive shafts of the driving means.

3. In a tractor having a motor, a frame structure providing a chassis extending continuously around the tractor, a platform confined within the frame structure, a housing for the driving means between the motor and the driving axle, comprising a unitary casing providing longitudinal and transverse housings, said casing divided on a single horizontal plane, providing a fixed lower section and a removable upper section.

4. In a tractor having a motor, a frame structure, and a casing for housing the driving means from the motor to the driving axle, said casing comprising a unitary structure having longitudinal and transverse compartments divided horizontally in the same plane, providing upper and lower sections, the former being removable and the latter being fixed and adapted to support journal bearings for all shafts of the driving means.

5. In a tractor having a motor, a frame structure, and a casing for housing the driving means from the motor to the driving axle, said casing comprising a unitary structure having longitudinal and transverse compartments divided horizontally in the same plane, providing upper and lower sections, the former being removable and the latter being fixed and adapted to support journal bearings for all shafts of the driving means and the driving axle.

6. In a tractor, a frame comprising channel members extending continuously around the tractor, a platform confined within said frame, driving wheels supported in said frame, said platform being recessed to accommodate said driving wheels, a motor support on said frame, and a casing adapted to house a drive connection between the motor and the driving wheels, comprising a unitary structure divided horizontally in a single plane, providing upper and lower sections, the former being removable and the latter being fixed and adapted to support journal bearings for all shafts of said drive connection and the axle of the drive wheels.

WILLIAM KNUDSEN.